United States Patent

Kawamoto

[11] Patent Number: 5,890,157
[45] Date of Patent: Mar. 30, 1999

[54] INFORMATION COMMUNICATION SYSTEM

[75] Inventor: Youji Kawamoto, Tokyo, Japan

[73] Assignee: Sony Corporation, Tokyo, Japan

[21] Appl. No.: 647,046

[22] Filed: May 9, 1996

[30] Foreign Application Priority Data

May 12, 1995 [JP] Japan .................................... 7-114373

[51] Int. Cl.⁶ .................................................. G06F 17/30
[52] U.S. Cl. ................................ 707/10; 707/2; 707/104
[58] Field of Search .................................. 395/610, 615; 455/56.1; 707/10, 104, 2

[56] References Cited

U.S. PATENT DOCUMENTS

| | | | |
|---|---|---|---|
| 4,831,582 | 5/1989 | Miller et al. | 364/900 |
| 4,868,866 | 9/1989 | Williams, Jr. et al. | 380/49 |
| 5,241,671 | 8/1993 | Reed et al. | 395/600 |
| 5,282,273 | 1/1994 | Ushio et al. | 395/325 |
| 5,379,421 | 1/1995 | Palazzi, III et al. | 395/600 |
| 5,463,381 | 10/1995 | Ryu et al. | 340/825.15 |
| 5,495,607 | 2/1996 | Pisello et al. | 395/600 |
| 5,564,071 | 10/1996 | Liou et al. | 455/56.1 |
| 5,623,656 | 4/1997 | Lyons | 395/610 |
| 5,682,525 | 10/1997 | Bouve et al. | 395/615 |
| 5,713,019 | 1/1998 | Keaten | 395/610 |
| 5,761,500 | 6/1998 | Gallant et al. | 395/610 |

OTHER PUBLICATIONS

Sexton et al., "IBM prototype PC stars in radio net debut" PC Week, p. 5(1), 1990.

"Swedish Police Department Outsources Data Network to Transpac" Communications Week, p. 50, 1994.

Lindstom, "Law Enforcement Goes Wireless", Communications Week, p. 31, 1993.

*Primary Examiner*—Thomas G. Black
*Assistant Examiner*—Michael J. Wallace, Jr.
*Attorney, Agent, or Firm*—Frommer Lawrence & Haug, LLP.; William S. Frommer

[57] ABSTRACT

An information communication system having cell stations 1, 2, 3, . . . provided in plural divided possible communication regions, a mobile switcher 7 controlling the cell stations and a personal station 8 as communication means for having communication with the cell stations. The information communication system further includes databases 4, 5, 6, . . . for storing the multimedia information for the regions where the cell stations exist, a data update unit for updating the information stored in the database and a communication function unit for communication of data of the database. A user in possession of the personal terminal 8 may have access to the nearest cell station for the region where he or she is present in order to acquire the multimedia information he or she desires in the region from the database owned by the cell station. With the information communication system, the database communication traffic control need not be changed even if the number of the personal stations receiving the information purveying services is increased and the same information may be received from any source at the same charges.

16 Claims, 7 Drawing Sheets

INFORMATION COMMUNICATION SYSTEM

BACKGROUND OF THE INVENTION

1. Field of the Invention

This invention relates to an information communication system in which a user accesses a cell station (base station) using a personal station (portable information terminal) for acquiring the desired information.

2. Description of the Related Art

Figure 1:
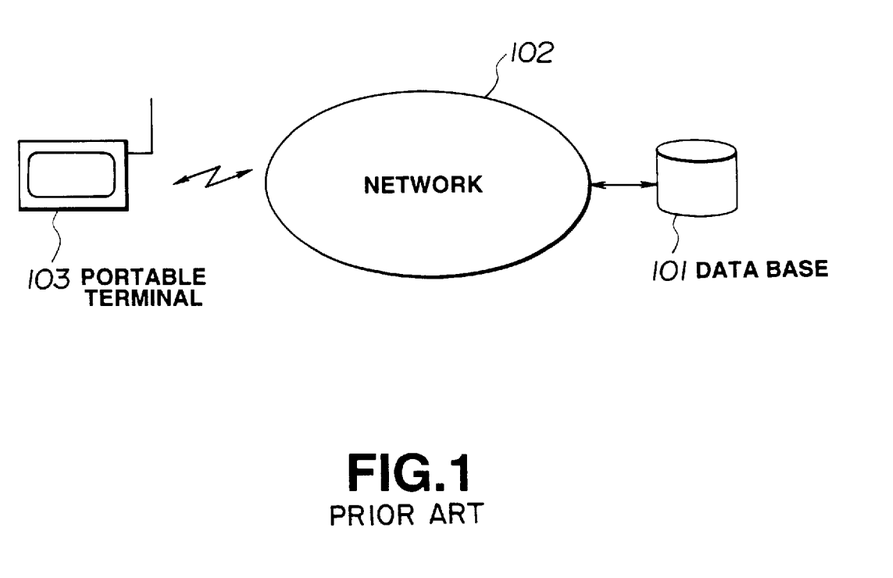
FIG. 1 illustrates a conventional network.

The information communication system in conventional radio communication includes a database 101 for storing multimedia information, exemplified by the picture information, character information or the speech information, a network 102 supervising the contents of the data base 101 and controlling the accessing by the user, and a personal station 103 via which the services from the network 102 may be received, as shown in FIG. 1.

The user may have access to the network 102 using the personal station 103 and also may have access via the network 102 to the database 101 for acquiring the information from within the database 101.

The database 101 may be of the concentrated management type in which the information is managed at a single point, or of the distributed type in which the information is managed at plural points.

In both of these database types, since a large amount of the multimedia information is stored in each database, communication traffic management, that is management of the total time of a switcher device of the network 102 taken up by communication calls made in a unit time via terminal equipments, such as the personal station 103, becomes crucial.

In a majority of cases, since there are only one to several databases 101, the communication distance from the personal station 103 to the database 101 tends to be increased in case data communication is performed using a connection network, so that communication charges may be excessively increased for the same received information.

On the other hand, since the number of installed personal stations 103, network speed or the transmission system is determined by the occupied time of the switcher, the communication traffic management needs to be corrected each time a new personal station is installed.

In addition, because of the voluminous multimedia information stored in each database, the load on the hardware for executing user access control tends to be increased.

There is disclosed in JP Patent Kokai Publication JP-A-4-347938 an arrangement having a database on the terminal side. In such arrangement, since a database needs to be stored in the terminal side, a large memory space is required, which is not desirable for the personal station.

SUMMARY OF THE INVENTION

It is therefore an object of the present invention to provide an information communication system in which database communication traffic management information need not be corrected despite increase in the number of personal stations receiving information purveying services, such that the same information may be acquired from any sources at the same charges.

In one aspect, the present invention provides an information communication system having a cell station provided in each of plural divided possible communication ranges, a mobile switcher for controlling the cell stations and a personal station for having communication with the cell station. The information communication system includes a database for storing the multimedia information of a region where the cell station is present, data update means for updating the information stored in the database, and a communication function unit for updating the information stored in the database. The personal station has communication with the nearest cell station for acquiring the multimedia information corresponding to the location of the personal station.

Preferably, the data update means in the cell station updates the contents of the database based on data sent via a communication satellite.

Preferably, the cell station includes communication means for accessing the data base(s) of other cell station(s).

In another aspect, the present invention also provides an information communication system including a mobile switcher having a cell station comprised a communication function unit for data transmission and reception, the communication function unit for exchanging data between the cell stations, a database for storing the multimedia information and data update means for updating the multimedia information of the database, and a personal station having a communication function unit for data transmission and reception with the cell stations and communication means for having communication with the database of the mobile switcher. A radio link is established between the personal computer and a nearest one of the cell stations and subsequently the database of the mobile switcher the cell station of which is controlled by the personal computer is accessed for acquiring the multimedia information concerning the database.

Preferably, data update means in the mobile switcher updates the contents in the database based on data sent via a communication satellite.

In still another aspect, the present invention provides a cell station having cable communication means with a mobile switcher having a control function and radio communication means with a personal station for which the possible communication range has been set. The cell station includes a database for storing the multimedia information of a region where the cell station is present and update means for updating the information stored in the database.

Preferably, data update means in the cell station updates the contents of the database based on data sent via the communication satellite.

With the information communication system of the present invention, the user has access to the nearest cell station by radio communication with a personal station capable of receiving information purveying services. If the desired multimedia information, such as the picture information, letter information or speech information, is stored in the database provided in the cell station accessed by the user, he or she accesses this database in order to acquire the desired multimedia information. The database contents may be updated by data update means in each cell station.

The data update means is also responsive to data sent via a communication satellite for modifying only data to be updated among a variety of the multimedia information stored in the data base.

If communication means is provided in each cell station for having access to the databases of other cell stations when the necessity arises, and if the desired multimedia information is not stored on the database of the cell station accessed by the user, the communication means of this cell station accesses the databases of other cell stations for checking into whether or not the desired multimedia information is stored therein. If the desired multimedia information is stored in the databases of the other cell stations, it is taken out therefrom and sent to the user. If otherwise, the communication function unit accesses databases of other cell stations to repeat the similar operations until the desired multimedia information is found.

If the mobile switcher is provided, and the multimedia information desired by the user is not stored in the database of the cell station, the mobile switcher enables communication between the user and the other cell stations so that the user may have access to the databases of the other cell stations for data retrieval.

Also, with the information communication system according to the present invention, thee user has access to the nearest cell station by radio communication using a personal station capable of receiving information purveying services. The cell station accessed by the user accesses the database of the mobile switcher by the communication function unit to enable communication between the user and the databases of the mobile switcher in order to permit the user to take out the multimedia information exemplified by the character or speech information. The data update means in the mobile switcher updates the database contents.

The data update means is responsive to data sent via a communication satellite to change only data updated by the multimedia information stored in the databases.

DESCRIPTION OF THE PREFERRED EMBODIMENTS

Referring to the drawings, preferred embodiments of the information communication system according to the present invention will be explained in detail.

Figure 2:
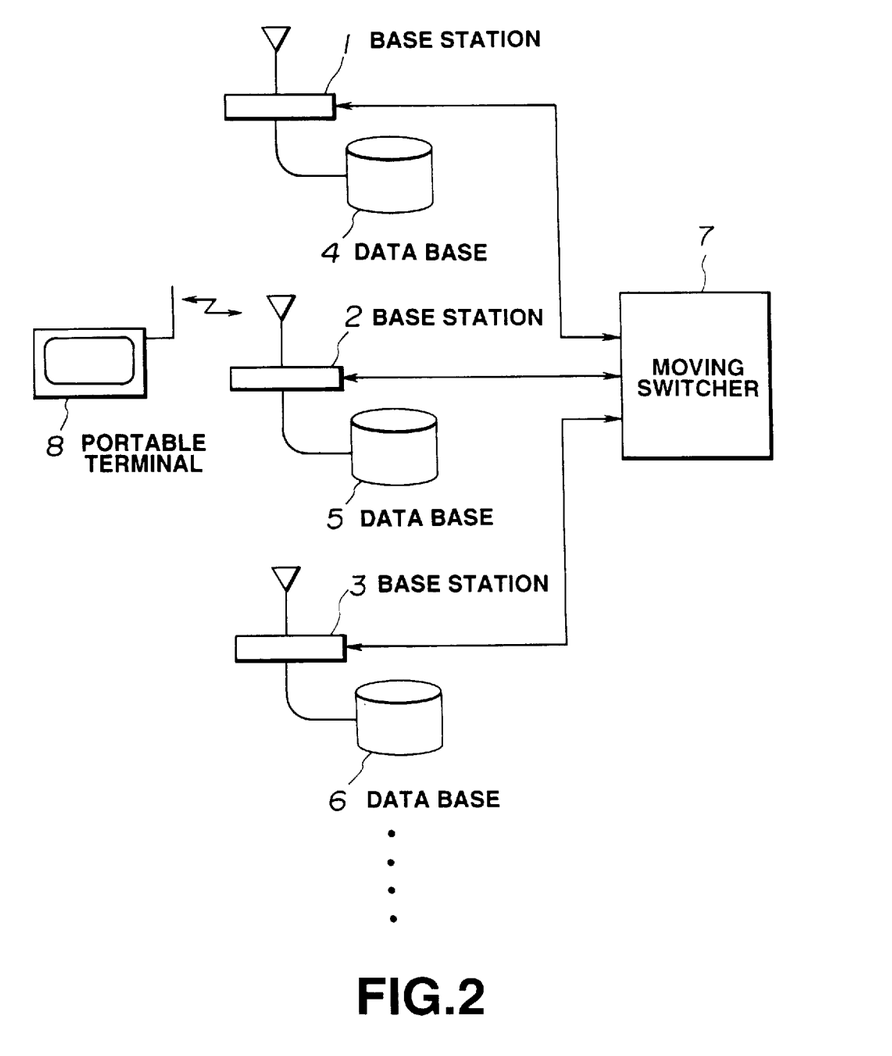
FIG. 2 illustrates the structure of a first embodiment of the information communication system according to the present invention.

FIG. 2 shows a first embodiment of the information communication system.

The first embodiment of the information communication system includes cell (base) stations 1, 2, 3, . . . each provided in one of plural divided possible communication ranges, a movable switcher 7 controlling the cell stations and a portable terminal (personal station) 8 adapted for having communication with the cell stations. The cell stations include databases 4, 5, 6, . . . for storing the multimedia information of regions where the cell stations are located, a data updating unit for updating the information stored in the databases and a communication function unit for communication of database data. The user in possession of the personal station 8 may have access to the near-by cell station of the region where the user is present for acquiring the desired information in the region. The cell station is such a cell station applied to a personal handyphone system (PHS).

The data updating units in the cell stations update the contents of the databases 4, 5, 6, . . . based upon data sent from communication satellites.

The cell station also has a communication terminal for accessing the databases of other cell stations.

Figure 3:
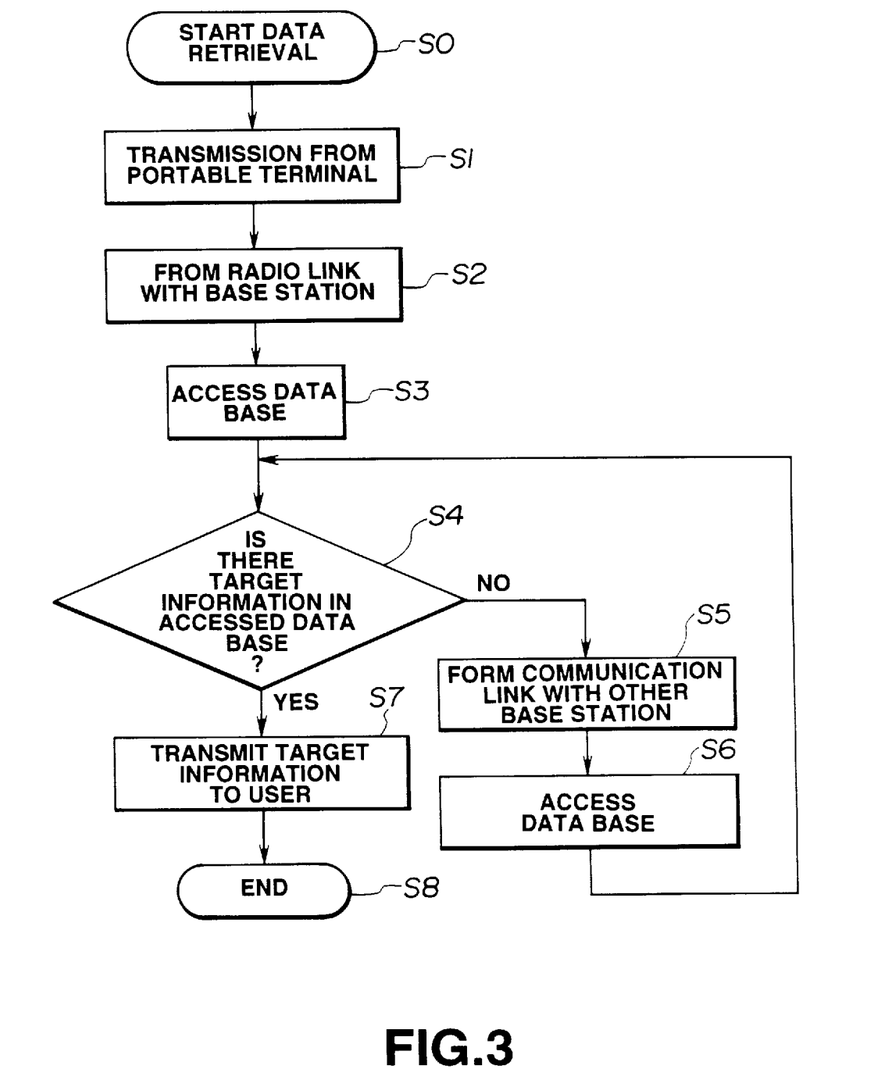
FIG. 3 is a flowchart for illustrating the operation of the first embodiment of the information communication system.

Before proceeding to explanation of the above-described first embodiment of the information communication system, the operation of the communication system is explained by referring to the flowchart of FIG. 3.

First, at step S0, the user sets the targeted multimedia information to start a data retrieval operation.

At step S1, the user requests transmission of the multimedia information, using the personal station 8 shown in FIG. 2. The processing then transfers to step S2, where a radio link is established between the personal station 8 and the near-by cell station, responsive to the transmission request. The processing then transfers to step S3, where a communication path is formed with a database provided in the cell station for which the radio link has been established, and access is had to this database. The processing then transfers to step S4.

At step S4, it is judged whether or not the target multimedia information has been stored in the database. If the result of judgment is NO, that is if the target multimedia information is not stored in the accessed database, the processing transfers to step S5, where a communication link is formed with another cell station connected over a cable with the cell station for which the radio link has been established as described above. The processing then transfers to step S6, where a communication path is formed with the database provided in the cell station where the communication link has been established at step S5, and access is had to this database. The processing then transfers to step S4.

If the result of judgment at step S4 is YES, that is if the target multimedia information is stored in the accessed database, the processing transfers to step S7, where the target multimedia information is taken out and transmitted to the personal station, so that the user may acquire this multimedia information. The processing transfers to step S8 where the processing comes to a close.

In light of the above, the actual operation is now explained.

In the above-described first embodiment of the information communication system, the cell stations 1, 2, 3, . . . are arranged at a pre-set distance from one another. These base stations are provided with respective databases 4, 5, 6, . . .

In the databases 4, 5, 6, . . . , the multimedia information in the possible communication ranges of the associated cell stations, such as restaurant information, motion picture information, concert information or the information on the railroad schedule, is stored.

The movable switcher 7 is connected to the plural cell stations via integrated services digital network (ISDN), as a communication network, for controlling the entire cell stations. For example, if the multimedia information desired by the user is not stored in the database possessed by the cell station connected over a radio link with the personal station 8, a transmission request is sent from the cell station. The movable switcher 7 is responsive to the transmission request to have access to other cell stations.

The personal station 8 accesses the nearest cell station over a radio link and transmits a transmission request responsive to the request by the user for establishing a communication path with the database.

Figure 4:
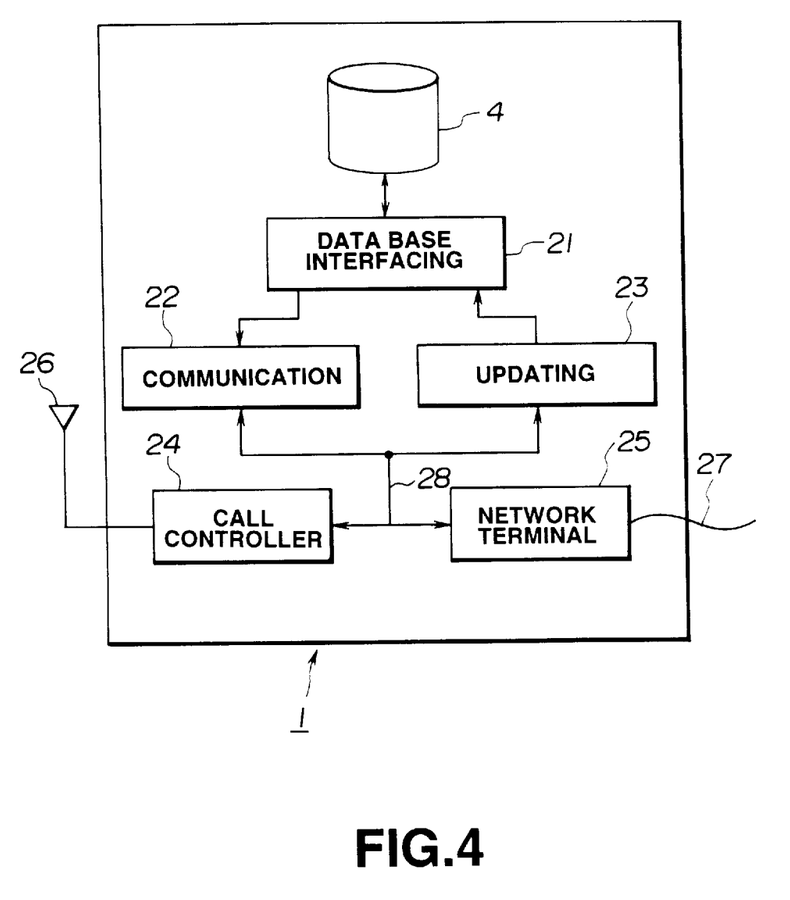
FIG. 4 is a block diagram showing essential portions of each cell station of the first embodiment of the information communication system.

FIG. 4 shows an illustrative example of the cell station 1 as representative of the cell stations.

In the cell station 1, a network terminal 25 is connected via an ISDN network 27 to the movable switcher 7 of FIG. 1. The network terminal 25 is connected not only to a call controller 24 but also to a communication unit 22 and to an update unit 23 via an S/T point interface 28. The communication unit 22 and the update unit 23 are also connected via a data interface 21 to the database 4. The call controller 24 has an antenna 26.

The call controller 24 is responsive to a transmission request transmitted from the personal station 8 by the user to a network formed by the ISDN network 27 to form a radio link between the cell station 1 and the personal station 8 and transmits a transmission request to the network terminal 25 or the communication unit 22 via the S/T point interface 28. On reception of the transmission request from the network or the communication unit 22 to the personal station 8, the call controller 24 outputs a transmission request from the antenna 26 to the personal station 8 by radio communication.

The network terminal 25 has a function for interfacing between the network and the cell station 1 and operates as an electrical and physical interface between input data transmitted by two different transmission systems, for example, between data sent by a transmission system including the ISDN network 27 and data handled within the base station 1.

Specifically, the network terminal 25 adjusts data derived from a transmission request from the personal station 8, sent from the call controller 24, while adjusting the transmission request sent from the network or the communication unit 22 and outputting the adjusted transmission request to the call controller 24. In addition, the network terminal 25 adjusts update data for updating the contents of the database 4 sent from the network over the ISDN network 27, as later explained, and issues the adjusted update data to the update unit 23.

The communication unit 22 executes data communication between the cell station 1 and the personal station 8 or between the cell station 1 and another cell station via the movable switcher 7. That is, the communication unit 22 is responsive to the transmission request from the personal station 8 to access the data base 4 via database interface 21 in order to search for the multimedia information desired by the user. In addition, the communication unit 22 is responsive to the transmission request sent from the other cell station via the ISDN network 27 in order to search for the multimedia information desired by the user who has established the radio link with the other cell station.

Accessing to the other cell station is now explained.

The cell station 1 of FIG. 4 deems the database 4, database interface 22 and the communication unit 21 as a set of communication terminals, and accords a telephone number to this communication unit 22. In a similar manner, the cell station 1 accords different telephone numbers to respective communication units of the respective cell stations.

It is also possible to provide other sets of communication terminals, similar to the above-described set of the communication terminals, and to connect these sets to the S/T point interface 28 over a bus for providing plural databases in one cell station. Up to a maximum of eight sets of the communication terminals may be provided in one network terminal.

If the plural sets of the communication terminals are provided as described above, a logical interface, or a so-called I-interface, applicable to the basic ISDN interface for starting each set of the communication terminals, may be deemed to have been established in the S/T point interface 28. An optional set of the communication terminals may be discriminated by according the ISDN sub-address or the personal telephone number as the identification number.

Thus, if the user has access to a predetermined set of the communication terminals, that is a predetermined database, the network is automatically handed over to the other set of the communication terminals in the same base station, at a time point when the target multimedia information is found not to have been stored in the database initially accessed by the user, and prior to the communication unit 22 accessing the other cell station via the movable switcher 7, in order to permit the user to have access to the predetermined database.

The user may also access the predetermined database by entering the ISDN sub-address or the personal telephone number from the personal station 8 instead of by automatically handing over the network to the other set of the communication terminals.

The update unit 23 of FIG. 4 is responsive to the update data to access the database 4 via database interface 21 in order to update the multimedia information specified by the update data.

The update data is directly entered to each cell station, or entered to each cell station from an updating center via e.g., a communication satellite or the movable switcher 7. The update data is used for comprehensively updating the contents of the entire database and is made up of the database identification number previously accorded to each database and the database identification information. Also, on reception of the update data, each database acquires the update data associated with the own database identification number and updates data based upon the acquired update information.

The update data need not be entered via the communication satellite. Instead, the update data may be entered to each base station from the updating center to each base station via a communication network. Although the update data may be data for comprehensively updating the contents of the database in their entirety, it is also possible to enter individual update data to each database and to cause each database to update the data based on the entered update data.

Figure 5:
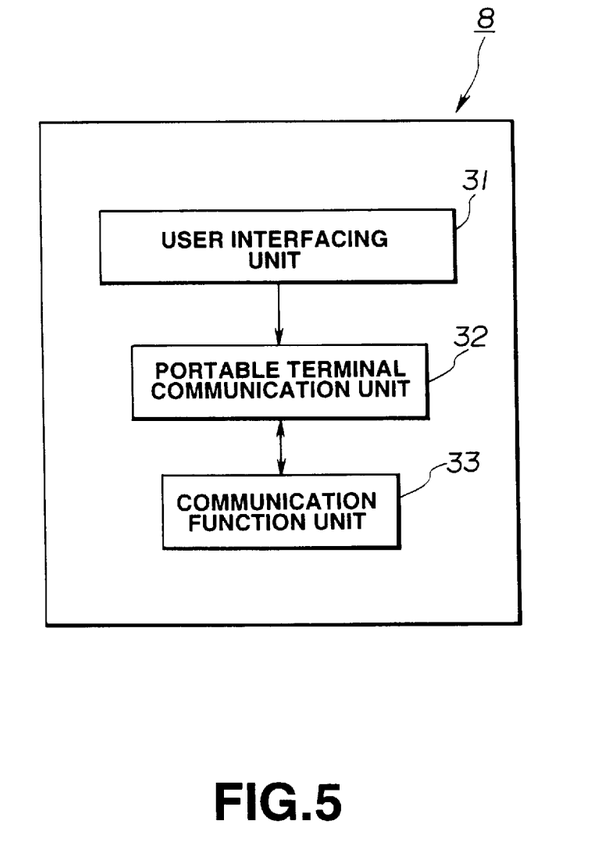
FIG. 5 is a block diagram showing essential portions of a personal station of the first embodiment of the information communication system.

FIG. 5 shows essential portions of the personal station 8 shown in FIG. 2.

The personal station 8 includes a user interface 31 for interfacing with the user, using the speech, text or video, a portable terminal communication unit 32 for having data communication with the database of the cell station after the radio link has been established with the cell station and a communication function unit 33 having a radio interface and a network connection controller for controlling a radio link with the cell station.

In the personal station 8, the user interface 31 connected to the portable terminal communication unit 32 is in turn connected to the communication function unit 33.

The user interface 31 interfaces with the user using the speech, text or video. That is, the user actuates an operating unit, not shown, for causing a signal specifying the operation contents to be outputted via the user interface 31 to the portable terminal communication unit 32.

When the network is connected to the nearest base station, that is when a radio link has been formed, the portable terminal communication unit 32 has data communication with the database of the cell station for which the radio link has been formed.

The communication function unit 33 has a PHS network connection control and a radio interface. On reception of a transmission request from the user interface 31 via the portable terminal communication unit 32, the communication function unit 33 immediately transmits a radio signal to the nearest cell station for establishing a radio link with the nearest cell station. The communication function unit 33 also has the function of receiving radio signals transmitted by the cell station.

With the present personal station 8, it is possible for the user to establish a radio link with the nearest cell station by actuating the actuation unit as described above, or to acquire the desired data by accessing to the database of the cell station for which the radio link has been established.

Figure 6:
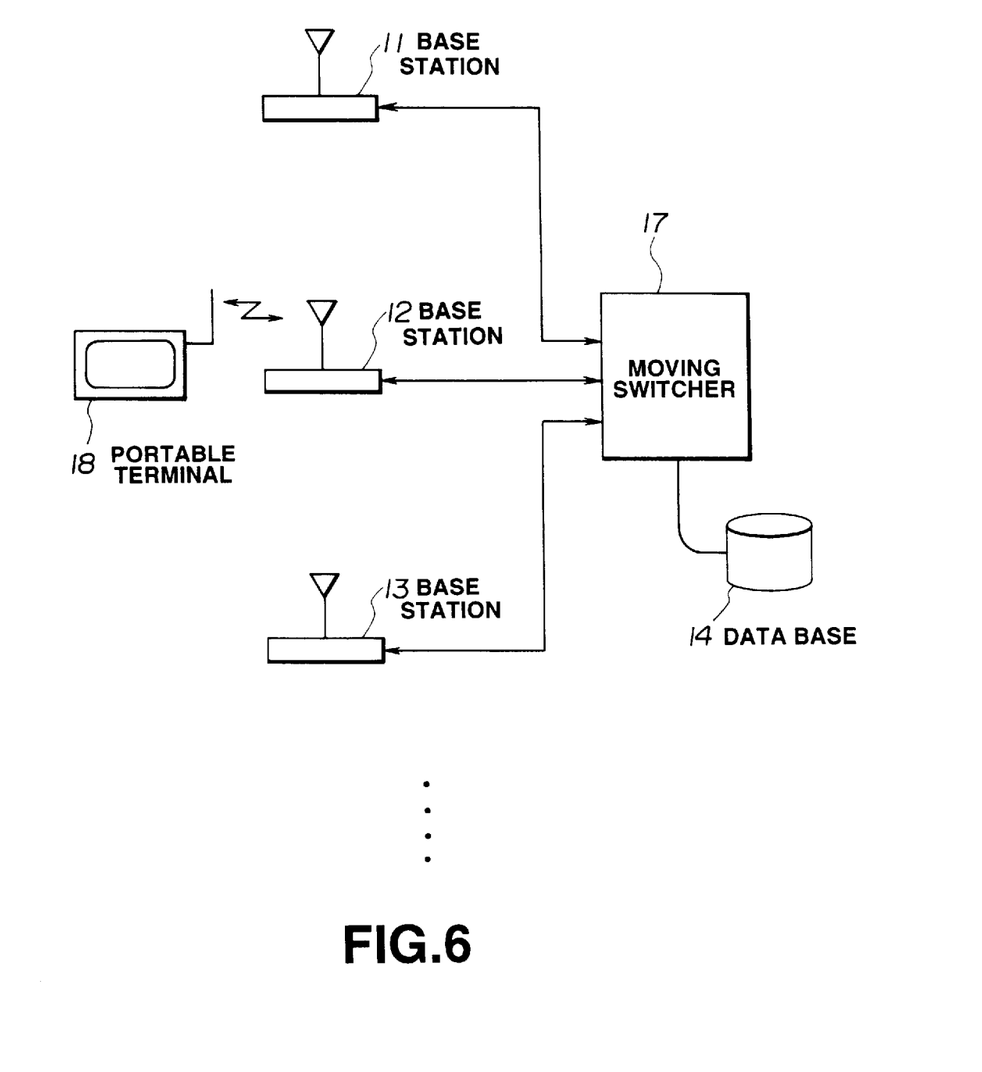
FIG. 6 illustrates the structure of a second embodiment of the information communication system according to the present invention.

FIG. 6 shows a second embodiment of the information communication system.

The present second embodiment of the information communication system includes cell stations 11, 12, 13, . . . having a communication function unit for data transmission and reception, and a movable switcher 17 having a communication function unit for controlling data exchange between plural cell stations and at least a database 14 for storing the multimedia information in the possible communication range of each cell station and a communication function unit for data transmission and reception with the cell station. The present information communication system also includes a personal station 18 having a communication function unit for data transmission and reception with the cell station and communication means for having the communication with the database 14 of the movable switcher 17. After a radio link has been established between the user in possession of the personal station 8 and the nearest cell station of the region where the user is present, access is had to the database 14 of the mobile switcher 17 controlling this cell station in order to permit the user to acquire the multimedia information of an optional region.

The data update means in the mobile switcher 17 updates the contents of the database 14 based on data transmitted from a communication satellite.

Figure 7:
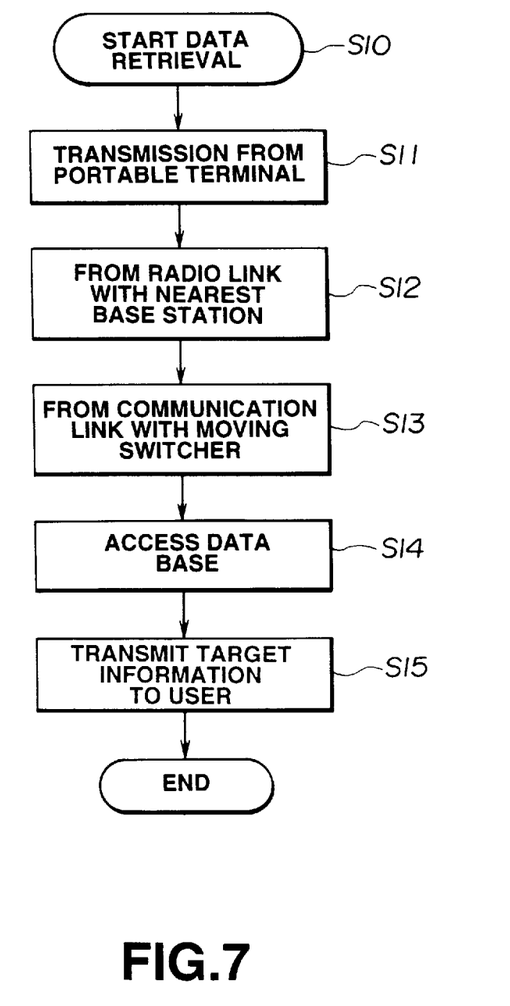
FIG. 7 is a flowchart for illustrating the operation of the second embodiment of the information communication system.

Before proceeding to description of the second embodiment of the information communication system, the operation of the system is explained by referring to the flowchart shown in FIG. 7.

At step S10, the user sets the target multimedia information to start the data retrieval operation.

At step S11, the user places a request for transmission of the above multimedia information, using the personal station 18 shown in FIG. 15. The processing then transfers to step S12 where a radio link is formed responsive to this transmission request between the personal station 18 and the nearest cell station. The processing then transfers to step S13 where a communication link is formed between the personal station 18 and the mobile switcher 17 connected over a cable to the cell station for which the radio link has been established with the personal station 18. The processing then transfers to step S14.

At step S14, accessing is had to the database provided in the movable switcher 17. The processing then transfers to step S15 where the target multimedia information is taken out and transmitted to the user who is now able to acquire the multimedia information. The processing is terminated at step S16.

In the above-described second embodiment of the information communication system, the mobile switcher 17 has a construction similar to that of the inner structure of the cell station 1 in the first embodiment of the information communication system shown in FIG. 3. Thus the mobile switcher 17 controls data exchange between base stations 1, 2, 3, . . . , while taking out the multimedia information desired by the user from the database 14 and transmitting the information to the cell station to which the user is linked over a radio link.

The transmission request is data specifying the service types and node numbers proper to the mobile switcher 17.

Similarly to the data update means 23 provided in each cell station of the information communication system according to the first embodiment, the data update means, not shown, provided in the inside of the mobile switcher 17, is responsive to update data stored in the database 14 for updating the multimedia information in order to access the database 14 via a database interface, not shown, for updating the multimedia information specified by the update data.

The update data is entered via e.g., a communication satellite from a update center to each cell station directly or via the mobile switcher 7. The update data is data used for comprehensibly updating the contents of the database 14 and has the update information specifying which of the multimedia information items in the database is to be updated. On reception of the update data, the database 14 acquires the update information and updates data based on the acquired update information.

The update data may be data entered to each cell station from the update center over the communication network, instead of being sent via the communication satellite.

The personal station 18 has the configuration similar to that of the personal station 8 in the above-described personal station 8. The radio link between the personal station 18 and the nearest cell station where the user is present is formed by operator actuation via the user interface as described above.

With the first and second embodiments of the information communication systems, the user only has to access the nearest cell station by actuating the hand-held personal station or PHS in order to obtain the target multimedia information.

Since the user does not have direct access to the database where the multimedia information is stored, the communication distance for acquiring the target multimedia information is not increased and hence the communication charge are reduced. In addition, since the communication traffic management for this database need not be corrected, data management may be facilitated.

It is assumed that the information on restaurants in a possible communication area, that is an area covered by each cell station or mobile switcher, is stored in each cell station or in the database provided in the mobile switcher in the first embodiment of the information communication system or in the second embodiment of the information communication system, respectively. The information on the restaurants includes the information such as the information on addresses, telephone numbers or the state of appointment for the current date.

If, for example, the user is residing in Shibuya and intends to search the state of appointments for the current data of restaurants in Shibuya, the user forms a radio link with the nearest cell station, using the personal station, and enters a request for the information on restaurants in Shibuya. This permits the user to acquire the restaurant information from the database.

If the user resides near Kichijoji and intends to acquire the information on restaurants in Shibuya, a radio link is formed with the nearest cell station, using the personal station, as in the above-described embodiments, and enters a request for the Information on Shibuya restaurants. This permits the user to acquire the restaurant information from the database.

The multimedia information may also be the information on motion pictures, concerts or railroad schedules, instead of the restaurant information.

If it is possible for the personal stations 8, 18 to transmit a so-called request agent comprised of the transmission request and a program stating the processing on the transmission request and a method for processing the transmission request itself, and the cell station of the first embodiment of the information communication system or the communication unit of the mobile switcher of the second embodiment of the information communication system has the function of processing the agent, that is the so-called agent communication function, it is possible for the cell station or the mobile switcher to release the communication link on reception of the request agent transmitted by the user via the personal station and to transmit a response agent to the request agent from the communication unit to the personal station after end of data analyses in order for the user to acquire the desired multimedia information.

If the agent communication function is employed, the network is temporarily closed after transmission of the request agent by the user and the network is again opened at the time of reception of the response agent, so that there is no necessity to make the network available during data retrieval, thus further reducing the communication charges.

With the above-described information communication system according to the present invention, since plural cell stations are provided, and a database is provided in each cell station, the user only has to access the nearest cell station in order to acquire the multimedia information of the area where the user is present, such that the user need not access the database having the long communication distance, and hence the shorter communication distance suffices to take out the multimedia information, thus enabling the communication charges to be reduced. Since the databases storing the multimedia information are distributed in respective regions, there is no necessity of drastically modifying the communication traffic control despite an increased number of subscribers for information purveying services.

If the database contents are updated on the basis of the update information sent via the communication satellite, the database contents, such as the picture information, with a voluminous file capacity, may be comprehensively updated, thus enabling the update time and the update charges to be reduced.

By providing each cell station with the personal station, it is possible for the user to take out the multimedia information of an optional region simply on accessing the nearest cell station. Since the multimedia information can be taken out from the optional region without regard to the communication distance between the user and the cell station in the optional region, communication charges for acquiring the desired multimedia information of the optional region may be reduced. Since the communication traffic management information is mainly the information between the cell stations, the database management between the cell stations may be simplified. In addition, since there is no necessity of managing the multimedia information of the entire regions by a sole database, the load on hardware may also be reduced.

Also, with the information communication system of the present invention, since plural mobile switchers are provided and a database is provided in each mobile switcher, the user may take out the multimedia information of a desired region simply on accessing the nearest cell station. Since the multimedia information of an optional region can be taken out in this manner without regard to the communication distance between the user and the cell station of the optional region, communication charges for acquiring the multimedia information of the optional region may be reduced. Since the communication traffic information is the information between the cell station and the mobile switcher, and there is no necessity of drastically changing the communication traffic management concomitant with the increased number of subscribers, database management may be simplified.

If the database contents are updated on the basis of the update information sent via a communication satellite, the database contents with a voluminous file capacity, such as the video information, may be updated comprehensively, the update time and update charges may be reduced.

What is claimed is:

1. An information communication system having cell stations provided at different communication ranges, a mobile switcher for controlling communications between said cell stations, and a personal station in remote communication with a nearest cell station, said system comprising:

database means resident to respective cell stations for storing respective multimedia information including information relevant to the region where respective cell stations are present;

data update means for updating the multimedia information stored in said database means;

a communication function unit for establishing communications between said personal station and said nearest cell station; and wherein, in response to a request from said personal station for multimedia information relevant to the region of a cell station located in a region other than said nearest cell station, said data update means updates the database means resident to said nearest cell station with the requested multimedia information from the other cell station such that the personal station accesses said requested multimedia information directly from said nearest cell station.

2. The information communication system as claimed in claim 1, wherein said data update means updates the contents of said database means with the requested multimedia information retrieved via a communication satellite.

3. The information communication system as claimed in claim 1, wherein said cell stations include communication means for accessing the database means resident to other cell stations.

4. The information communication system as claimed in claim 1, wherein said database means of a respective cell station stores multimedia information relevant to the region including restaurant information, motion picture information, concert information and railroad information.

5. The information communication system as claimed in claim 4, wherein said data update means updates said database means comprehensively for each type of multimedia information.

6. The information communication system as claimed in claim 5, wherein said communication function closes communications between said personal station and said nearest cell station while said data update means updates said multimedia information stored in said database means.

7. An information communication system comprising:

mobile switcher means including a communication function for exchanging multimedia information between cell stations;

database means resident to respective cell stations for storing the multimedia information;

data update means for updating the multimedia information of said database means;

a personal station including a communication function for establishing communication with the database means;

radio link means for establishing a radio link between said personal computer and a nearest one of the cell stations; and wherein, responsive to a request from said personal station for multimedia information resident to said database means of another cell station, the data update means updates said database means of the nearest cell station with the requested multimedia information retrieved by said mobile switcher means from said database means of said another cell station such that the personal station accesses, directly from the nearest cell station, said requested multimedia information.

8. The information communication system as claimed in claim 7, wherein said data update means updates the contents in said database means retrieved via a communication satellite.

9. The information communication system as claimed in claim 7, wherein said database means of a respective cell station stores multimedia information relevant to the region where said respective cell station is present including restaurant information, motion picture information, concert information and railroad information.

10. The information communication system as claimed in claim 7, wherein said data update means updates said database means comprehensively for each type of multimedia information.

11. The information communication system as claimed in claim 7, wherein said communication function closes communications between said personal station and said nearest cell station while said data update means updates said multimedia information stored in said database means.

12. A cell station having cable communication means with a mobile switcher having a control function and radio communication means with a personal station for which the possible communication range has been set, comprising:

database means for storing the multimedia information including information relevant to the region where a respective cell station is present; and data update means for updating the multimedia information stored in said database means with requested multimedia information retrieved by said mobile switcher resident to another cell station such that said personal station accesses said requested multimedia information directly from said respective cell station.

13. The cell station as claimed in claim 12, wherein said data update means updates said database means with data sent via a communication satellite.

14. The information communication system as claimed in claim 12, wherein said database means of a respective cell station stores multimedia information relevant to the region including restaurant information, motion picture information, concert information and railroad information.

15. The information communication system as claimed in claim 12, wherein said data update means updates said database means comprehensively for each type of multimedia information.

16. The information communication system as claimed in claim 12, wherein said radio communication means closes communications between said personal station and said respective cell station when said data update means updates said multimedia information stored in said database means.

* * * * *